July 17, 1928.
A. ZIMMERLI
APPARATUS FOR PRODUCING GLASS SUBSTITUTES
Filed May 29, 1924    2 Sheets-Sheet 1
1,677,576
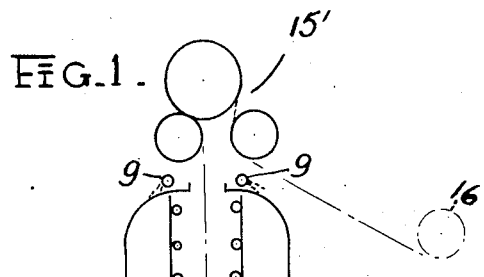
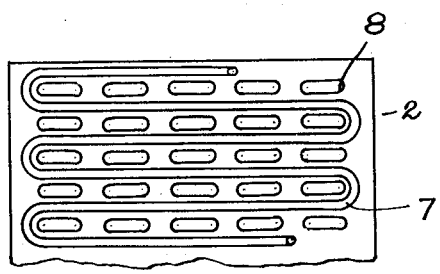
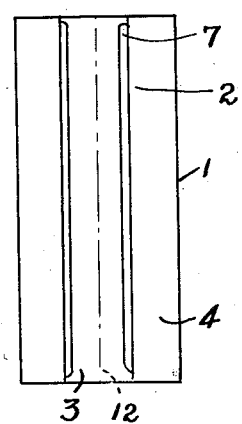
INVENTOR
ADOLPH ZIMMERLI
BY
ATTORNEY July 17, 1928.
A. ZIMMERLI
1,677,576
APPARATUS FOR PRODUCING GLASS SUBSTITUTES
Filed May 29, 1924    2 Sheets-Sheet 2
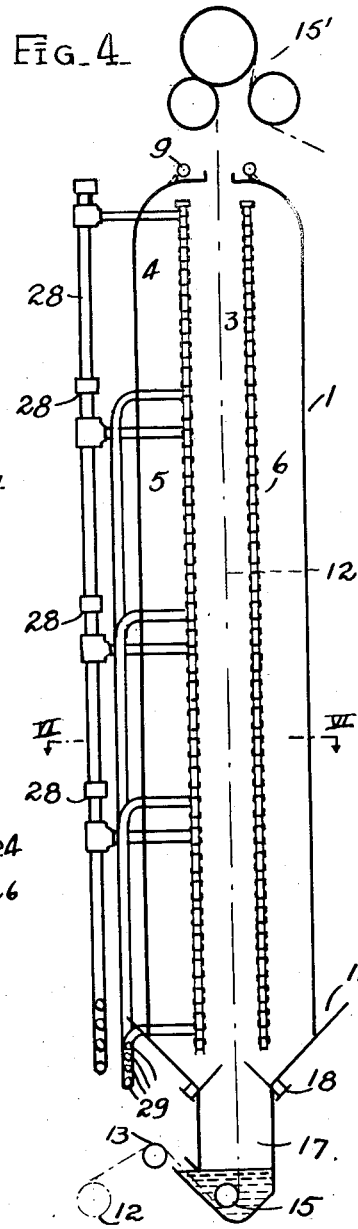
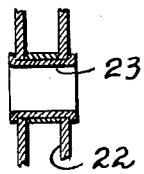
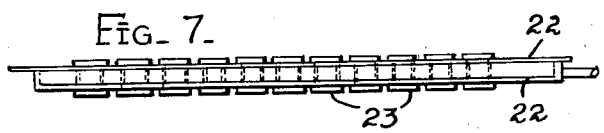
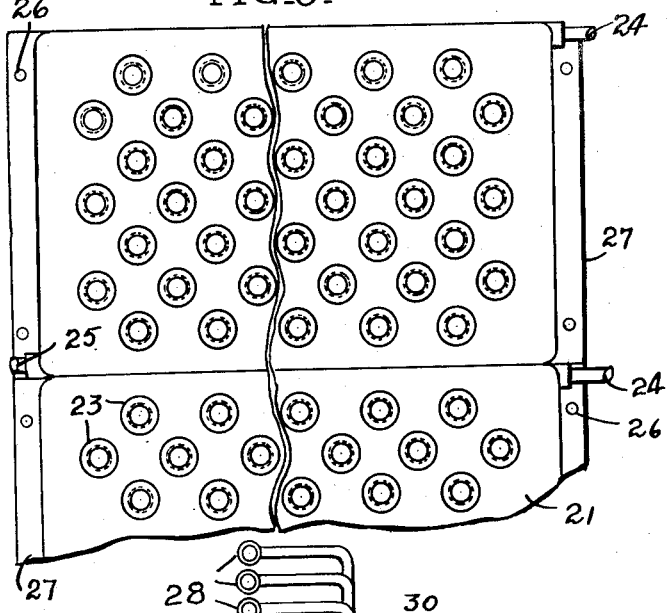
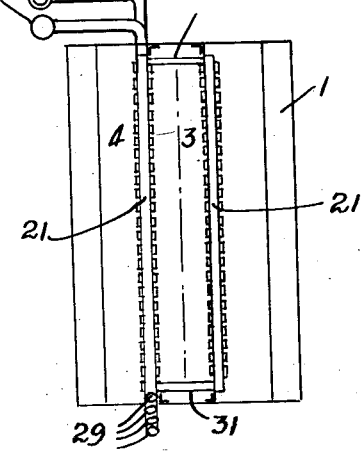
INVENTOR
ADOLPH ZIMMERLI
BY
ATTORNEY Patented July 17, 1928.

1,677,576

UNITED STATES PATENT OFFICE.

ADOLPH ZIMMERLI, OF NEW BRUNSWICK, NEW JERSEY, ASSIGNOR, BY MESNE ASSIGNMENTS, TO ACETOL PRODUCTS, INC., A CORPORATION OF DELAWARE.

APPARATUS FOR PRODUCING GLASS SUBSTITUTES.

Application filed May 29, 1924. Serial No. 716,553.

My invention relates to a method of, and apparatus for, producing a substitute for window glass, and more particularly to a product of the character which is formed by coating a reticulated material with a transparent film.

An object of my invention is the provision of a method for uniformly coating a reticulated material with a thin, transparent film having weather-resisting and heat-insulating properties.

Another object of my invention is the provision of apparatus for practicing my method in a continuous manner.

Other objects of the invention have to do with various features of construction and arrangement of parts hereinafter set forth and defined by the appended claims.

In United States Patent 1,580,287, issued to J. J. Colle et al., and assigned to Cello Products Incorporated there is disclosed and claimed a glass substitute comprising a reticular metallic base covered with a thin, transparent film firmly adhering to but only slightly incasing the strands of said base. In a copending application of mine, filed March 20, 1924, Serial No. 700,733 and assigned to Cello Products Incorporated there is disclosed a composition of matter or lacquer suitable for coating the reticular metallic base employed by Colle et al. in the fabrication of their product. In another copending application of mine, filed December 17, 1923, Serial No. 681,217 and assigned to Cello Products Incorporated, there is also disclosed an apparatus for recovering the solvent of the coating material or lacquer such as described in my aforesaid application, Serial No. 700,733. In the present invention I contemplate the process of producing a glass substitute such as disclosed in the Colle et al. patent by coating a suitable base material with my aforesaid lacquer or composition by means of the apparatus set forth in my aforesaid application, Serial No. 681,217, and reproduced in the accompanying drawings.

Referring to the accompanying drawings:

Figure 1 illustrates diagrammatically a vertical sectional view of an apparatus embodying my invention;

Figure 2 is a fragmentary elevation of the inner surface of the partitioning walls supporting the heating units;

Figure 3 is a transverse section of the apparatus taken on lines III—III of Figure 1;

Figure 4 is a view similar to Figure 1, showing a modification of the partitioning walls and heating units employed;

Figure 5 is an enlarged elevational view of the modified heating units;

Figure 6 is a transverse section of the form of apparatus shown in Figure 4 and taken on lines VI—VI thereof;

Figure 7 is a plan or end view of one of the heating units shown in Figure 5; and Figure 8 is an enlarged detailed sectional view showing one of the openings in the plate or sections constituting the partitioning walls forming the separate compartments.

I have illustrated an apparatus embodying my invention which is adapted especially to the coating of fabrics and the like. Referring to the drawings the apparatus shown therein may comprise an enclosure 1 divided vertically by partitioning walls 2, forming an inner or heating chamber 3 and an outer or condensing chamber 4. The partitioning walls 2 may comprise a heat insulating material such as asbestos board lined upon its inner surface with sheet iron. Suitably supported upon the inner surface of the partitioning walls 2 are oppositely disposed heating units 5 and 6. These units may comprise coils 7 (see Figs. 1 to 3) the turns or sections of which are spaced as closely together as possible and preferably formed of half inch pipe secured in any approved manner to the partitioning walls 2. Openings 8 are formed intermediate the several turns of the heating coils 7, thus affording passage ways for placing the chambers 3 and 4 into communication with each other.

The enclosure may be made from sheet metal with the upper end of the side walls converging in such a manner that the opening at the top of said enclosure is constricted although remaining open to the atmosphere. The outer surfaces of the side walls of the enclosure 1 are cooled by means of water sprays 9, mounted at the top thereof and adapted to play water thereon, which by force of gravity flows downwardly until collected in troughs 11 formed at the bottom of the enclosure from whence the water may be drawn off. The height of the enclosure 1 is so calculated that all of the solvent is evaporated before the coated object reaches the top thereof. Since the top of the enclosure 1 is partially opened to the atmosphere, the air within the enclosure will be displaced by the vapors of the solvent, without mixing therewith to any extent, since the specific gravity of the vapors of all volatile solvents, such as mentioned below and in commercial use, is considerably higher than that of air at the same temperature; such vapors even at temperatures considerably above their boiling point are heavier than cold air. In calculating the height of enclosure 1, consideration should be given to such factors as the speed at which the objects are caused to travel through the inner or heating chamber 3, the temperature to which the coils 7 are heated, the character of the coating material, etc. All such factors, however, can be more or less roughly estimated inasmuch as it is only essential to accomplish the purpose in view that the height of the enclosure 1 be such that the solvent is substantially all vaporized before the coated object leaves the heating chamber 3 and at the same time avoid the premature drying or setting of the coating formed thereon.

I have found it convenient to employ steam heating units and discovered that it is sometimes desirable to have the same composed of a plurality of sections which may be heated separately or independently of each other. This form of construction will hereinafter be more fully described with respect to Figs. 4 to 8, but the main features thereof are obviously applicable to the coil type heating units. The spacing of the heating units is such that the coated objects passing therebetween are in sufficient proximity thereto that the radiated heat therefrom effectively vaporizes the solvent from the coating material on said objects. It is obvious that the hotter the heating units are maintained the more rapid the evaporation of the solvent, which permits greater rapidity of movement of the coated objects through the apparatus. Care should be exercised, however, not to prematurely cause the setting of the coating material, particularly the outer surface thereof, as undesirable results may follow.

The modications shown in Figs. 4 to 8 relate principally to changes in the construction of the heating units 5 and 6. In this form of my apparatus the heating units are each composed of a plurality of sections 21. These several sections are composed of a pair of closely spaced rectangular plates 22 united by side and end walls formed at the edges of said plates. The plates 22 are perforated by oppositely disposed openings into which are fitted hollow steam tight connector members 23 which resemble in construction and appearance miniature boiler tubes of a steam boiler. The function of the connector members 23 is to provide means of communication between the heating chamber 3 and the condensing chamber 4. Each of the sections 21 are provided with an inlet and an outlet connection 24 and 25, respectively, and are adapted to be fitted edgewise longitudinally one upon another, and secured to upright supporting members (not shown) in any suitable manner, as, for example, by passing bolts through holes 26 made in the marginal flanged edges 27. The dimensions of the sections 21 as to width and height are such that when properly mounted within the enclosure 1 a given number of said sections form partitioning walls for dividing the enclosure into the two compartments comprising the heating chamber 3 and condensing chamber 4.

A separate steam rise or pipe 28 is furnished for each of the inlet connections 24 and a separate return pipe 29 for the outlet connections 25. It will be noted that the heating sections 21 which are oppositely disposed are so connected by pipes 30 and 31 as to have a common inlet pipe 28 and a common outlet pipe 29. By using different steam pressures in the several pipes 28 it is possible to heat the sections 21 to different temperatures which may be progressive in an inverse order from the bottom up, i. e., the lowermost section would be heated the hottest. It is to be appreciated, however, that although this section would normally be the hottest but because of the great absorption of heat by the solvent vapors at this region of the enclosure 1, the internal temperature of the heating chamber may not vary widely throughout its length. In order to increase the efficiency of the condensing chamber 4 the outer surface (inner surface with respect to said chamber) of the sections 21 may be lined with heat insulating material such as asbestos board (not shown). In such an event, the lining material should be provided with apertures corresponding in size and position to the tubes or connectors 23, so as not to block the passageways between the chambers 3 and 4.

The container 14 for holding a coating solution or substance is joined to the enclosure 1 by means of a saturation chamber 17. The container 14 is provided near the bottom thereof with an aperture which has formed contiguous thereto a narrow upwardly inclined extension. Located in the bottom of container 14 and substantially in the vertical axis of the enclosure 1 is an idle roller 15. An exterior idle roller 13 is positioned to cooperate with the roller 15 in such a manner as to guide the material to be coated under the latter roller. A set of rollers 15" suitably mounted above the opening at the top of enclosure 1 is adapted to align the fabric material in its passage through the heating chamber 3. A power driven receiving roller 16 is employed to pull the fabric material through the apparatus and wind it into rolls of any desirable size.

The coating substance or lacquer through which the fabric or wire cloth is passed may comprise a cellulose derivative, except nitrocellulose, and may be made in accordance with the formula set forth in my aforesaid application, Serial No. 700,733. I may use cellulose acetate which is soluble in acetone or methylacetone to which has been added a suitable plasticizer. I prefer to employ ethyl-paratoluolsulphoamide for this purpose, inasmuch as it imparts to the resulting composition weather resisting properties, ability to wet or adhere to metal and follow the expansion and contraction thereof. I have secured excellent results with using these substances in the following proportions:

Cellulose acetate, about_____ 100 pounds
Ethyl-paratoluolsulphoamide, about
_____ 20 pounds
Light solvent, about_____ 100 gallons The solvent in the above formula may comprise either acetone or methylacetone. Since these substances are comparatively expensive and can be diluted with liquids which are non-solvents in themselves but which become so when mixed, I have found that benzene and/or alcohol may be mixed with acetone and that benzene and/or denatured alcohol may be mixed with methylacetone is substantial proportion.

The operation of the apparatus illustrated in the drawings and described above is as follows. A roll 12 of the fabric material, such as wire cloth, is suitably supported at the base of the apparatus, so that the material may be led over the idle roller 13, and through the aperture formed in the container 14 holding the coating solution. The fabric is then passed under the idle roller 15 which is submerged in the coating material, thence through the heating or drying chamber 3, through the set of rollers 15″, and finally wound upon the power driven receiving roller 16. As the fabric passes through the apparatus, moving in an upward direction, it is first immersed in the coating material and then immediately passes through the saturation chamber 17. Any excess of the coating material adhering to the fabric flows back into the container 14, and the saturation chamber 17 being full of the solvent vapor, evaporation therein takes place slowly or to no appreciable extent. That is to say, the chamber 17 being saturated with the solvent vapor (which is heavier than air), no appreciable evaporation takes place while the coated material travels through said chamber; this condition allows the coating to distribute itself evenly over the surface of the fabric. If the fabric were passed from the container 14 immediately into the drying chamber 3, irregularities in the thickness of the coating would have no time to disappear, inasmuch as the film which forms on the surface as soon as evaporation takes place will prevent any spreading or uniform distribution thereof.

From the saturation chamber the fabric passes into the heating or drying chamber 3 which is maintained at such a temperature that the solvent is volatilized from the coating substance before the fabric leaves the enclosure, evaporation takes place immediately upon entrance of the fabric and continuing until the solvent is completely evaporated. In the event the heating units are separate the temperatures thereof may be regulated so as to be progressive, in which event more rapid, and perhaps complete, volatilization of the solvent may be effected. The solvent vapors escape through the openings 8 in the partitioning walls into the condensing or outer chamber 4. The solvent vapors contacting with the cooled surfaces of the chamber 4 are condensed and collected in the bottom thereof. These vapors being heavier than air and their total volume being kept substantially constant by condensing the excess thereof, but small loss is occasioned by the escape of the solvent vapors through the top of the enclosure 1. The condensed vapors may be recovered by being drawn off through pipes 18.

From the foregoing it is obvious that the process of coating objects may be carried out continuously with my apparatus and uniform results obtained as to the quality of the product secured therefrom.

Certain modifications of my invention will suggest themselves to those skilled in the art, but I wish to be understood as contemplating such modifications as come within the scope of the appended claims.

What is claimed is:

1. An apparatus for manufacturing glass substitutes, comprising an enclosure divided vertically into a drying chamber and a condensing chamber, said chambers being in communication with each other, a liquid container, a saturation chamber joining said container and enclosure, and means for passing a wire cloth through said container, thence through said saturation and drying chambers.

2. An apparatus for manufacturing glass substitutes, comprising an enclosure divided vertically into a drying chamber and a condensing chamber, said chambers being in communication with each other, a liquid container, a saturation chamber joining said container and enclosure, means for passing a wire cloth through said container, thence through said saturation and drying chambers, thence through an aperture at the top of said drying chamber, and winding means for rolling the coated material upon its exit from the enclosure.

3. An apparatus for manufacturing glass substitutes, comprising an enclosure divided vertically by partitioning walls into an inner and an outer chamber, means for heating said inner chamber by radiant heat, means for cooling said outer chamber, means for placing said chambers in communication with each other, a liquid container, a saturation chamber joining said container and enclosure, means for passing a wire cloth through said container, thence through said saturation and inner chambers, thence through an aperture at the top of said inner chamber, and means for effecting the travel of said cloth through said apparatus and winding it into rolls.

4. An apparatus for manufacturing glass substitutes, comprising an enclosure divided vertically into a drying chamber and a condensing chamber, said chambers being in communication with each other, a liquid container, a saturation chamber joining said container and enclosure, a roller located in the bottom of said container and adapted to be submerged in a coating substance contained therein, means for passing a wire cloth under said roller and through said container, thence through said saturation and drying chambers, thence through an aperture at the top of said drying chamber, and means for effecting the travel of said cloth through the apparatus and winding it into rolls.

5. An apparatus for manufacturing glass substitutes, comprising an enclosure divided vertically by partitioning walls into a drying and a condensing chamber, means for heating said drying chamber by radiant heat, means for cooling said condensing chamber, means for placing said chambers in communication with each other, a liquid container, a saturation chamber joining said container and enclosure, means for immersing a fabric material in a coating solution held within said container, means for bringing the coated material into close proximity of the walls of said drying chamber, and aligning it with respect thereto during its passage through said chamber.

In testimony whereof, I have hereunto subscribed my name this 27th day of May, 1924.

ADOLPH ZIMMERLI.